United States Patent

[11] 3,556,223

[72] Inventor Thomas G. Pardy
 Stratford, Conn.
[21] Appl. No. 734,100
[22] Filed June 3, 1968
[45] Patented Jan. 19, 1971
[73] Assignee Bridgeport Implement Works, Inc.
 Stratford, Conn.

[54] STONE PICKER AND TURF MAINTENANCE MACHINE
 16 Claims, 9 Drawing Figs.
[52] U.S. Cl. ................................................. 171/85,
 56/400
[51] Int. Cl. ...................................................... A01b 43/00
[50] Field of Search ........................................... 171/63, 85,
 101; 56/400, 376

[56] References Cited
UNITED STATES PATENTS
| | | | |
|---|---|---|---|
| 1,425,544 | 8/1922 | Reiter............................ | 171/85 |
| 2,938,586 | 5/1960 | Gaffney.......................... | 171/63 |
| 3,019,586 | 2/1962 | Gustafson....................... | 56/400 |

Primary Examiner—Antonio F. Guida
Attorney—Mattern, Ware & Davis

ABSTRACT: A stone picker and turf maintenance machine capable of removing stone and debris from areas to be seeded with a minimum of initial soil preparation. The machine has a series of curved, individually flexible rake fingers or teeth which are adapted for engagement below the surface of the ground to lift stones to the surface. The stones are then engaged by flexible tines rotating on a reel and are moved along the surfaces of the rake fingers. The entrained soil and soil amendments are aerated, pulverized and sifted through the rake fingers. The stones are moved along by the tines within the curvature of the rake fingers and are deposited in a bin.

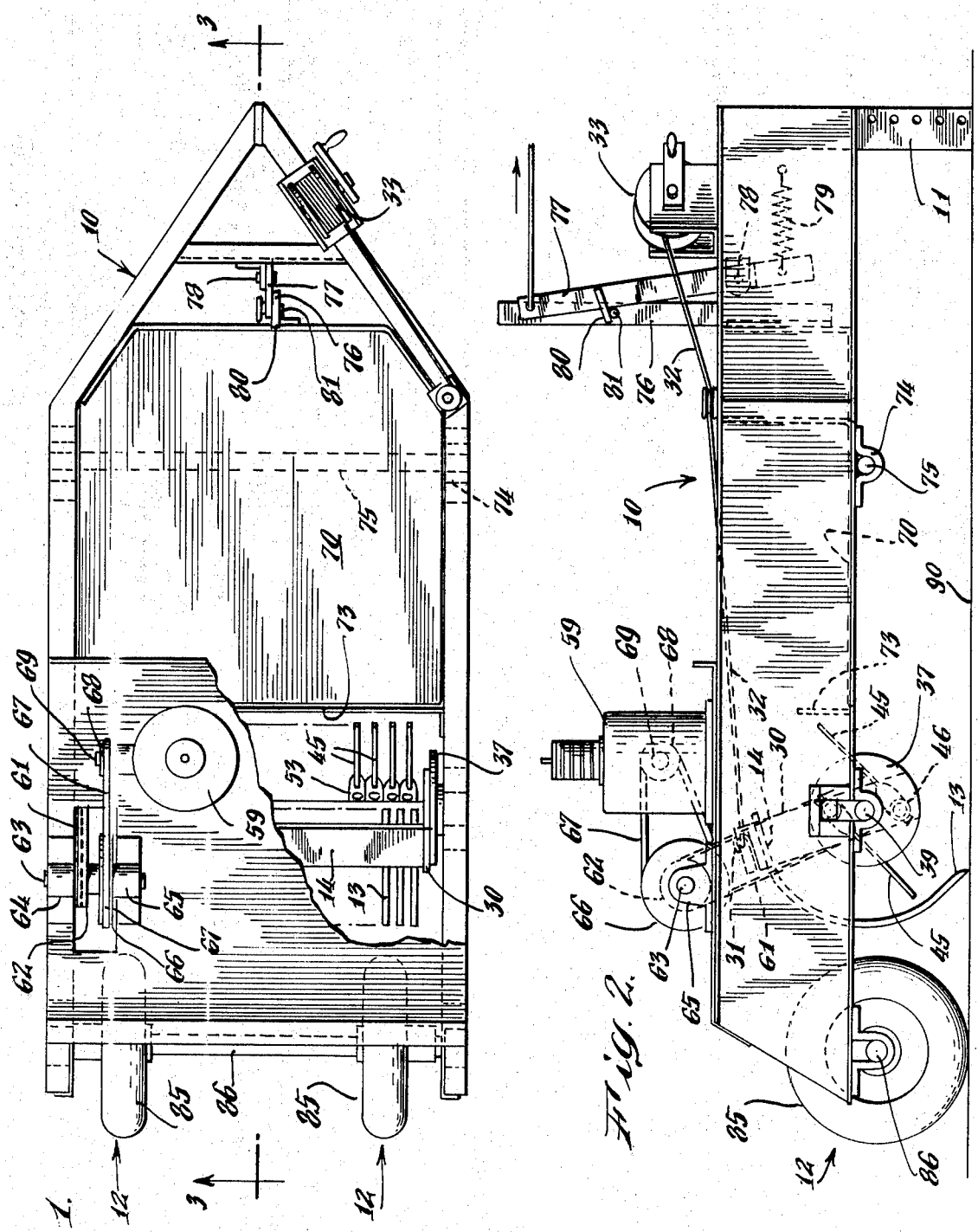

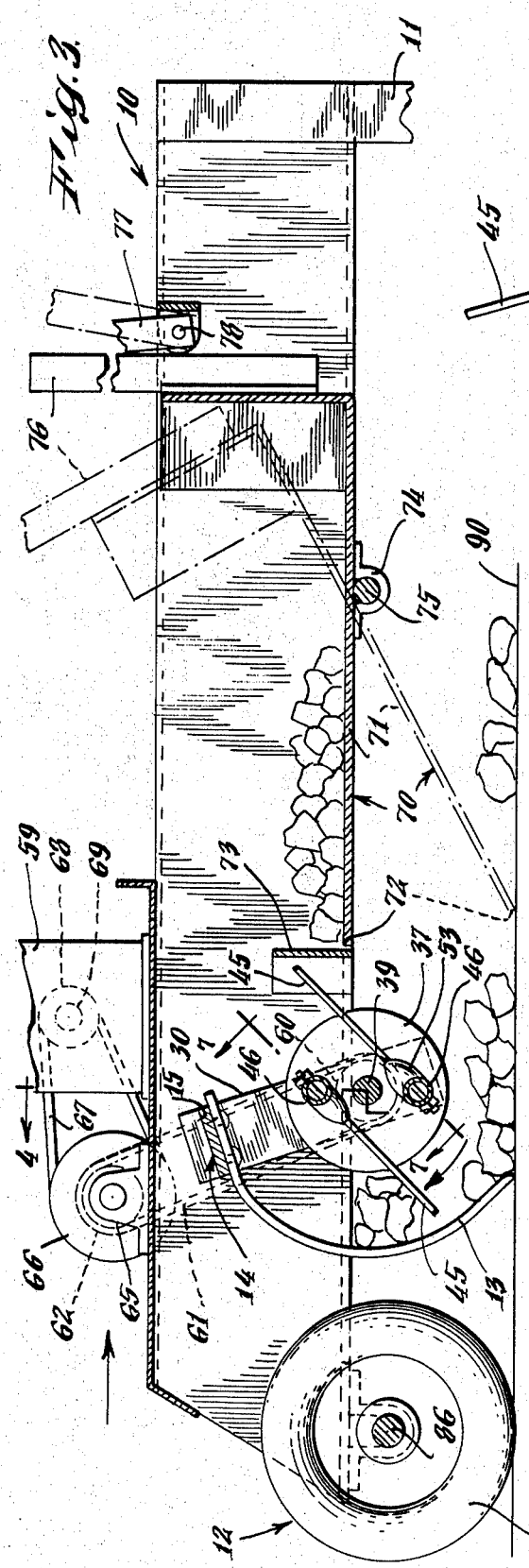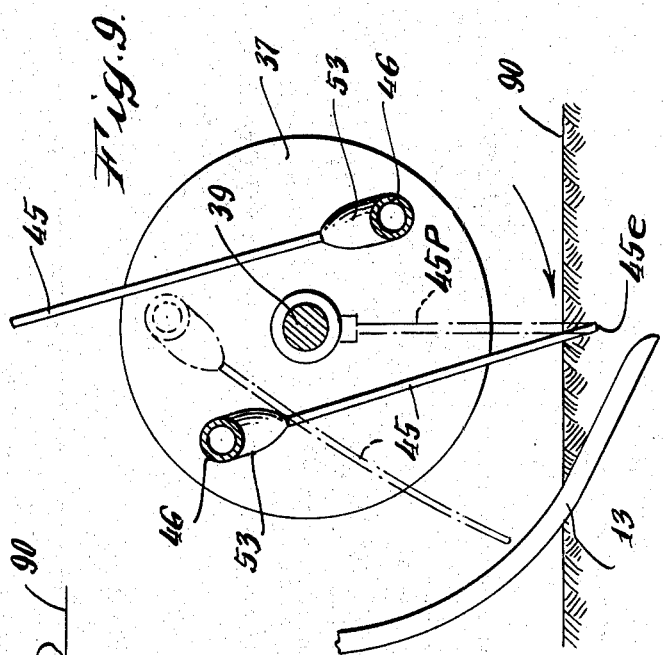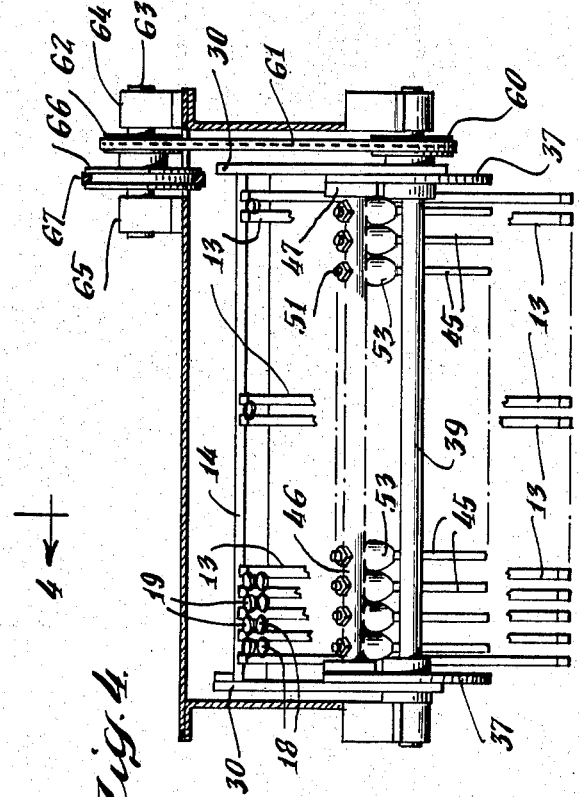
INVENTOR.
THOMAS G. PARDY
BY
Mattern, Ware & Davis.
ATTORNEYS.

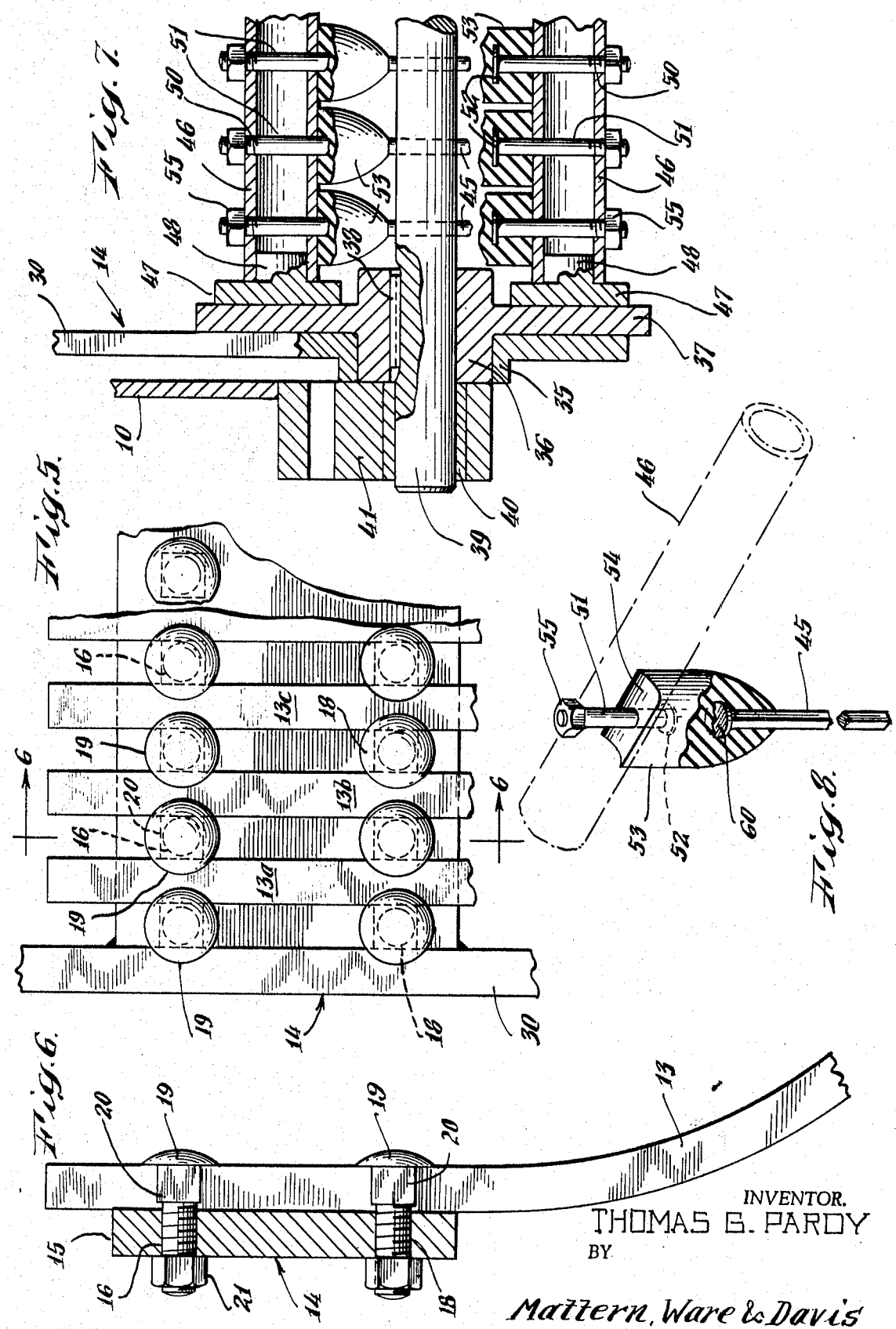

STONE PICKER AND TURF MAINTENANCE MACHINE

SUMMARY OF THE INVENTION

A commercially successful stone picker, according to prior art, is disclosed in O. F. Reiter, U. S. Pat. No. 2,686,996, which is assigned to the assignee of the present application. The stone picker disclosed in the Reiter patent is a heavy duty device comprising a grill-like curved stone guide having a continuous ground surface-engaging blade for guiding stones and sifting the soil from stones that are pushed into it by two or more gratelike paddles or pickers mounted on a rotating reel.

A stone guide is adapted to be drawn over the ground from which the stones are to be removed, and to receive stones that are directed toward it by the rotating pickers. It functions principally to receive stones directed to it by the pickers and to guide the stones toward a container. Any soil that is picked up by the pickers or the stone guide is sifted through openings in the stone guide, all as set forth in the Reiter patent.

Those skilled in the art will appreciate that the successful operation of the Reiter structure is base on the utilization of heavy, rigid mechanisms including as one element the stone guide that he shows. This is in the form of a heavy frame formed of relatively heavy large bars and plates. The pickers of Reiter are also relatively heavy bars that rotate with a reel to accept stones from the soil and to project the stones upwardly in a trajectory determined by the shape of the stone guide. The pickers include welded reinforcing members and are mounted for unitary paddlelike movement. Heavy springs are utilized to hold each picker assembly in picking position on the reel, the springs allowing some yielding movement of the entire picker assembly relative the reel in the event the picker should strike a large stone that requires its yielding movement or a stone becomes jammed in the machine.

The machine of my invention varies considerably from the earlier concept of Reiter in that I utilize a ground-engaging stone guide having a series of individual yielding forklike teeth which are adapted to enter into the soil from which stones or trash are to be removed although it should be understood that it is not necessary that the fork teeth actually be entered into the soil where such entry is not required by conditions. Because I use individual yielding or flexing teeth, it is obvious that each will react independently when contacting a stone and each will be adapted to yield and to move upwardly and downwardly when required. As a particular feature of this portion of the invention, the fork teeth are mounted in a very ingenious manner so that they will be held in proper alignment with one another while flexing individually. Also, they may readily be removed for replacement by the operator without the use of special tools or welding equipment.

A basic feature of my invention resides in the extremely novel picking tines that I have conceived for the rotating stone picker. The picking tines of my invention are mounted on a reel as broadly shown in Reiter for rotation to bring the tines into operative relationship to the rake teeth of the stone guide. In my concept, the tines are considerably longer than the radius of a circle defined by the distance between the axis of rotation of the reel and the end of each picking tine, to the end that each picking tine is secured to the reel at that side of the axis of rotation opposite the side of the reel to which the picking end of the tine extends. Furthermore, the secured end of each tine is offset relatively to the axis of rotation of the reel, so that each picking tine is mounted at an angle to the diameter of the reel in order to contribute a sweeping action relative to the soil. This sweeping action will be more fully explained in the descriptive portion of the specification.

As a more particular feature of this portion of my invention, each picking tine is formed of flexing spring metal, and each picking tine is independently secured preferably in a resilient socket so that not only may each picking tine flex bodily, but each picking tine may also flex through the resiliency of the socket securing it to the reel. Further, because of the greater length of each picking tine that is made possible by the extremely novel mounting thereof in the reel, better utilization of the springlike character of the picking tines is made possible. In other words, longer picking tines may be used because of the novel mounting of the picking tines, thereby making possible the better utilization of the flexing of the tines, as well as the sweeping action inherent in the offset mounting of the tines.

Those skilled in the art will understand that bacause I utilize springlike fork or rake teeth and picking tines, the operation of my machine will not depend on the rugged strength of structural members. Thus, the springlike tines and fork teeth will bypass one another if that is required because of particular soil and stone conditions, and the stone picking action will be extremely effective.

The novel machine thus formed by the springlike curved rake toothed stone guide and the offset resiliently mounted springlike rotating tines can be used very advantageously for other soil treatments such as aeration, pulverization, and the blending of various soil amendments, such as fertilizer, loam and the like, to produce an ideal seed bed. Furthermore, the novel machine thus formed can also be s used for such turf maintenance tasks as raking, aerating and thatching, all of which were impossible with the prior art stone pickers such as shown in the above Reiter patent.

Furthermore, the prior art stone pickers were adapted for merely picking stones that were laying on the surface of the ground. When it was desired to remove stones from the subsurface, treatment with other soil-conditioning machines was necessary before the stone picking operation; for example, the soil had to be harrowed, plowed, or raked prior to stone picking. The machine of the present invention with the curved individually flexible rake toothed stone guide and the revolving resiliently mounted long spring tines is adapted for removing stones and trash to a considerable depth below the surface of the ground, thus reducing the number of operations required for the preparation of the seed bed.

As a still further feature of my invention, I employ a novel arrangement of wheels for supporting the stone picker of my invention. As in the Reiter patent, the forks or rake teeth and the picking tines cooperating therewith are supported at one end of a chassis, and opposed wheels and an axle are mounted at this end outboard of the picking mechanism. This results in poor picking when the wheel on the unpicked side of the machine rides over a large stone or hard agglomerate as the stone picking mechanism is raised above the surface of the ground. Such means would, therefore, have to be gone over at least twice with prior art machines. In my machine I have conceived the feature of placing the wheels inwardly of the path defined by the picking tines and rake teeth. Therefore, in my machine the wheels always traverse an area that has been acted upon by the machine, and which is, therefore, relatively smooth. In this way, I exercise very effective control over the operation of my picking tines and rake, all through an extremely simple concept and its utilization, and the machine normally has to pass over each area of the ground only once.

It will also be obvious that because of my contribution, I am able to use a relatively large reel and relatively long picking tines while employing a machine of the lowest possible profile commensurate with the particular lengths of the picking tines. Naturally, this is because the picking tines are not radially secured to the reel, Further, despite my longer picking tines, I am able to place the picking tine reel closely to the stone receiving container. Again, this is due to the fact that the radius of the circle described by the ends of the picking tines is considerably less than the length of the picking tines.

During development of my new machine I found that contrary to my expectations the resilient picker teeth should be square in cross section rather than circular. The square cross section is less likely to deflect small stones which may then work their way through the resilient tines.

The above generally described novel design permits the stone picker and turf maintenance machine of the present invention to be produced in any desired size, such as a compact machine for use with small tractors for lawns and small areas, as well as large heavy duty machines for use with commercial tractors operating in large recreational, farm, and industrial soil preparation and turf maintenance operations.

OBJECTS OF THE INVENTION

It is, therefore, an object of the present invention to provide a stone picker.

Another object of the invention is to provide a combined stone picker and turf maintenance machine.

A further object of the invention is to provide a stone picker and turf maintenance machine of the above character which may be commercially manufactured in different sizes.

A still further object of the invention is to provide a stone picker and turf maintenance machine of the above character that will remove stones and debris from beneath the surface, as well as from the surface of soil or sand.

Another object of the invention is to provide a stone picker and turf maintenance machine of the above character for aerating, pulverizing and blending soil amendments.

Still another object of the invention is to provide a stone picker and turf maintenance machine of the above character that may also be used for such turf maintenance tasks as raking, aerating and thatching.

A further object of the invention is to provide a stone picker and turf maintenance machine of the above character of low profile and great compactness.

A still further object of the invention is to provide a stone picker and turf maintenance machine of the above character that is not influenced adversely by adjacent areas which have not yet had the stones removed therefrom.

Another object of the inventions is to provide a stone picker and turf maintenance machine of the above character in which individual stone picking and raking parts may be conveniently replaced.

Still another object of the invention is to provide a stone picker and turf maintenance machine of the above character that will perform the tasks of removing stone and debris from the surface and subsurface of soil, aerate, pulverize and blend soil amendments to produce a ready seed bed in a single operation.

Other objects of the invention will in part be obvious and will in part appear hereinafter.

The invention accordingly comprises the features of construction, combination of elements, and arrangement of parts which will be exemplified in the construction hereinafter set forth. The scope of the invention is indicated in the claims.

THE DRAWINGS

For a fuller understanding of the nature and objects of the invention, reference should be had to the following detailed description taken in connection with the accompanying drawings in which:

FIG. 1 is a top view of a machine embodying my invention;

FIG. 2 is a side view of the machine of FIG. 1;

FIG. 3 is a view similar to FIG. 2 showing the stone receiving container both in its normal and in its dumping positions;

FIG. 4 is a cross-sectional view taken along line 4–4 of FIG. 3;

FIG. 5 is a partial view showing the manner in which the stone guide forks are individually secured to a rack;

FIG. 6 is a cross-sectional view taken along line 6–6 of FIG. 5;

FIG. 7 is a cross-sectional view taken along line 7–7 of FIG. 3;

FIG. 8 is a perspective view showing the square shape of each picker tine and the manner in which it is secured to the revolving reel; and FIG. 9 is a fragmentary cross-sectional view showing the relating of the picker tines to the machine in various positions thereof, and also showing the improved picking action of the picker tines of the present invention as compared to the picking action of a picker tine constructed according to the prior art.

The same reference characters refer to the same elements throughout the several views of the drawings.

DETAILED DESCRIPTION

Referring now more particularly to the drawings, the main frame of the machine of my invention is designated generally by reference numeral 10. The frame is supported at its forward end, when not being moved, by a leg 11, and at its rear by wheels and an axle, indicated generally at 12. The machine is equipped with a suitable hitch (not shown) whereby it may be secured to a tractor at its forward end and to be towed over the ground to be treated, The rake forks of my invention are best shown in FIGS. 3, 5 and 6, although they may also be seen in other figures of the drawings. These forks are designated generally by reference numeral 13 and each fork is formed of a square bar of spring steel fabricated into the curved form illustrated in the drawings. The several curved forks 13 are adapted to be secured to a rack designated by reference numeral 14.

The rack takes the form of a flat straight plate 15, as shown. It a has two rows of holes 16 and 18 drilled in it such that when carriage bolts 19 are engaged therewith the square portions 20 of the carriage bolts will snugly engage the fork teeth 13 so that they may be secured by the nuts 21 engaging the bolts 19. Thus, an individual tooth; for example 13b, may be removed by removing the bolts on each side thereof. Furthermore, no expensive machining of the rack 14 is required.

The rack 14 is mounted at each end to each of a part of plates 30–30, shown in FIGS. 2, 3, 4, and 7. At the upper end of one of the plates 30 there is secured a pin 31 (FIG. 2). A cable 32 is connected to the pin 31 at one end, the said cable being reeled over a reel 33 at its other end. The cable 32, as will be seen presently, rotates the bars and the rack 14 for positioning the forks 13. As shown in FIG. 7 each of the plates 30 extends downwardly and terminates in a bearing 35 that is mounted for rotation about a hub 36 that is fixed to a portion of the reel 37 on which the picking tines are mounted.

The hub 36, a key 38, and the reel 37 rotate together as a unit with a shaft 39 mounted in bearings 40–40 (only one of which is shown in FIG. 7). Each bearing 40 is formed on a part 41 of the main frame 10 of my invention. The two plates 30 and rack 14 may rotate about the hubs 36. Rotation in this manner is imparted by the cable 32, and obviously, the rack and the several forks 13 will be moved between an operative lowered position, such as shown in FIGS. 2 and 3, in engagement with the soil, and an upper position away from the soil.

As best seen in FIGS. 2 and 3, the forks 13 are curved in a circle concentric with shaft 39 except for straight portions at each end, where they are attached to the rack 14, and the ground-engaging portion. When the forks 13 are rotated about axle 39 to where their ground-engaging portions are directly below the axle 39, they are inserted several inches or more below the surface of the ground as may be required by the soil, sand or turf treatment operation being performed.

Coacting with the rack 14 and forks 13 are picking tines designated by reference numeral 45. These picking tines are secured to the reel 37 by means of a pair of pipes 46, each pipe being mounted at one end on the reel 37 by being fitted on a cylindrical lug 48, as best illustrated in FIG. 7. For the particular purpose, each cylindrical lug 48 may be integral with a plate 47 preferably welded to the reel 37, as also shown in FIG. 7. Each pipe 46 is formed with a series of bores 50 each adapted for passage for a bolt 51. Each bolt 51 is formed with a head 52 whereby it is secured to a resilient socket 53, as shown in FIG. 8 Preferably, each bolt is secured to a socket 53 at the time that the socket is cast. The socket has a surface 54, also as shown in FIG. 8, that conforms well to the curvature of pipe 46, so that it may be applied to the pipe and secured in the position shown by means of a nut 55 threaded on the bolt 51.

Each tine 45 is preferably formed of spring steel of square cross section and has a head 60 whereby it also may be secured to the resilient socket 53 during the casting thereof.

The socket 53 may be formed of a synthetic rubber material, or some other resilient material, so as to flex readily under stress. Of course, the several picking tines 45 also will bend readily relative to the sockets when circumstances demand. Therefore, the tines will function through bending bodily and also through the flexing of sockets 53.

As was earlier noted, there are two pipes 46 and by reference to FIGS. 2, 3, 4 and 9, it will be seen that these pipes are offset relative to the shaft 39 with which the reel 37 rotates on hubs 36. In other words, the two pipes 46 are well offset relative to the axis of rotation of the reel 37 with shaft 39. This makes it possible for each tine 45 to be considerably longer than would be possible if the construction and theory of the prior art were followed. In FIG. 9, the longest possible tine that can be used if prior art theory is followed, is designated by reference numeral 45P. The rather considerable increase in length that is made possible through the use of my construction is well emphasized in FIG. 9 by a simple comparison of the lengths of tines 45 and 45P.

A further advance of my construction resides in the feature that whereas tine 45P is radially positioned on the reel 37, and is, therefore, perpendicular to the soil in FIG. 9, tine 45 is at an angle to the soil and, therefore, better rakes the soil and also better coacts with forks 13; for example, if a stone becomes wedged between them. It should also be appreciated that, despite the offset position of tine 45 in FIG. 9, its end 45e will always move, unless flexed, on the circumference of a circle, the center of which is the center of the shaft 39. The ends 45e of tines 45 will, therefore, follow readily the curvatures of the forks 13. In dash and dot lines in FIG. 9, a tine 45 is shown slightly flexed, as will be the case when a relatively large stone is moved. The flexing action will be much more easily accepted by the tine 45 because of its mounting than were it in the radial position of the tine 45P. Further, the combination of yielding forks 13 with my tines provides an extremely effective picking action together with trouble free machine operation. I believe that the very considerable advance of my novel concept and its very complete departure from the prior art, will now be appreciated.

Furthermore, as shown in FIG. 9, the tines 45 in their unflexed condition extend several inches below the surface 90 of the ground. This is permissible with my flexible tines that will deflect if the ground is too hard and it facilitates removing stones and debris from below grade. It also makes it possible to simultaneously aerate and pulverize the soil and blend soil amendments to prepare the seed bed and to use the same machine for turf maintenance tasks such as raking, aerating and thatching.

The reel 37, as is best shown in FIG. 4, is formed with a pulley 60 secured to one end of the shaft 39. A belt 61 passes over this pulley and over a second pulley 62 mounted on a shaft 63 suitably supported by bearings 64 and 65 fixed to the main frame of the machine 10. A second pulley 66 is fixed to the shaft 63. Now referring to FIG. 1, over this pulley there extends a belt 67 that rides over a pulley 68 fixed to the shaft 69 of an internal combustion engine 59. The internal combustion engine 59, together with the belts and pulleys and other means illustrated, rotates the reel 37, and with it the picking tines 45, all as will be apparent. A clutch (not shown) may be included in the drive as in prior art stone pickers. Also, the engine 59 is provided with the usual speed control for controlling the rotation rate of the tines 45.

Now referring to FIG. 3, the machine of my invention utilizes a stone container designated generally by reference numeral 70. The stone container has a main plate 71, the end of which is s designated 72, and terminates at a transverse wall 73 extending across the main frame of the machine. It is obvious that the plate 71, together with the wall 73, forms in effect, a boxlike container to which stones may be directed as best illustrated in FIG. 3. The plate 71 is pivoted through a bearing 74 on a shaft 75, mounted on the main frame, and may readily be rotated to its dash and dotted line position of FIG. 3 when it is desired to dump the stones. Conventional means that are not part of my invention, are utilized to hold the plate 71 in its fill line position in FIG. 3, and to allow it to move to its dumping position, these conventional means being in the form of a vertical strut 76 integrally secured to the plate 71. Strut 76 is controlled by a bar 77 pivoted to the machine at 78 and urged by a spring 79 to the position shown in FIG. 2. In that figure a small latch 80 is shown coacting with a pin 81 on the strut 76 to hold strut 76 in position. Those skilled in the art will appreciate that various other means could be used for this purpose.

Each wheel of my machine is designated by reference numeral 85 and is mounted on an axle 86. The wheels are mounted inboard of the frame 10 of the machine behind the picking mechanism so that they will always roll in a path that has been treated by the forks 13 and the picking tines 45. Because of this construction, the forks 13 and the picking tines 45 will always be in a controlled related position relative to the wheels 85–85 and thus the surface of the ground being treated.

Now referring to FIG. 2, leg 11 is provided with a plurality of vertically aligned holes 92. A hitch (not shown) may be engaged therewith to support the front end of the machine at any one of several different levels. As the machine will thereby rotate about the wheel axles 86–86, the placement of the hitch will determine the depth of which tines 45 penetrate below the ground surface 90.

It will be noted that because the wheels 85 are in relatively close axial relation, stability of the vehicle is to some extend adversely affected. However, because of the manner in which I mount the picking tines, rather long picking tines may be used while permitting the picking reel to be mounted on a shaft positioned at a very low level on the machine. This permits a very considerable lowering of the overall height of the machine so as to compensate for the inboard positioning of the wheels.

It will be seen that I have thus provided a machine capable of removing stones and debris from a substantial portion of the subsurface as well as the surface of the ground. The arrangement of revolving tines and curved individually resilient rake fingers loosens the ground to the necessary depth, removes materials and will, for example, lead to the establishment of good permanent grass root. The revolving sifting action aerates, pulverizes, and blends soil amendments to produce an ideal seed bed.

The individual resilience of the revolving tines and stone guide rakes in combination with the stone guide depth and tine rotation rate speed controls permits the unit to be used for turf maintenance; for example, for raking, aerating and thatching.

The offset mounting of the individual resilient tines permits the unit to have a low profile and the inboard mounting of the wheels greatly reduces the width of the machine so that it may be manufactured in compact form for use with compact tractors for lawns and other small areas. Scaled-up versions of the machine may be used with commercial tractors for large recreational, industrial and farm seeding operations. The inboard mounting of the wheels insure that the raking action will be at a constant depth regardless of the presence of large stones or hard clods of earth in adjacent untreated areas.

The individually resiliently mounted rake teeth and revolving tines are less likely to be broken by stones which would jam in the prior art nonresilient mechanisms. If broken, the rake teeth and tines can be individually replaced by the operator of the machine without special tools, welding apparatus or the like.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

In the following claims the term "a significant depth below the surface of the ground" means at least that depth of stone removal, pulverization and aeration required to produce a seed bed for grass.

I claim:
1. A machine of the class described comprising:
   a. a soil contacting and sifting member comprising a plurality of individually mounted individually resilient curved teeth adapted for engagement with the ground from the surface thereof to a significant depth below the surface thereof; and
   b. a rotating reel concentric with said soil contacting member having mounted thereon a plurality of picker tines having a free end and a mounted end, each picker tine individually mounted to the reel and individually resilient, the distance between the free ends of said picker tines and their mounted ends being greater than the distance between the axis of said reel and said free ends of said tines.
2. A machine as defined in claim 1, and:
   c. wheels for supporting said soil contacting member and said reel, all of said wheels being mounted behind said soil contacting member and said reel and within the outer limits thereof whereby said wheels only contact ground previously treated by said teeth and said reel.
3. A machine as defined in claim 1, wherein said teeth are commonly mounted to a plate having two rows of holes therein, said mounting being by means of carriage bolts performing the dual function of spacing and fixing said teeth to said plate.
4. A machine as defined in claim 1, wherein each of said teeth is curved over the major portion thereof substantially in a circle substantially concentric with the axis of rotation of said picker reel with a straighter ground-engaging end to facilitate engagement of said teeth at a significant depth below the surface of the ground.
5. A machine of the class described comprising:
   a. a sifting member comprising a plurality of curved teeth adapted to separate from soil and to guide stones being picked into a container; and
   b. a rotating reel concentric with said sifting member having mounted thereon a plurality of picker tines having a free end and a mounted end, each picker tine individually mounted to the reel and individually resilient, the distance between the free ends of said picker tines and their mounted ends being greater than the distance between the axis of said reel and said free ends of said tines.
6. A machine as defined in claim 5 wherein said tines extend in their unflexed condition to a significant depth below the surface of the ground treated thereby.
7. A machine as defined in claim 5 wherein the mounted ends of said tines on said reel are offset relative the axis of rotation of said reel so that when the free end of a tine is in vertical alignment with the axis of rotation of said reel, the mounted end of said tine on said reel will be at the side of said axis of rotation toward said sifting member.
8. A machine as defined in claim 7 wherein each of said tines is a springlike rod with its said mounted end imbedded in a socket formed of resilient material.
9. A machine as defined in claim 8 wherein each of said tines is square in cross section.
10. A machine as defined in claim 5 wherein each of said tines is a springlike rod with its said mounted end imbedded in a socket formed of resilient material.
11. A machine as defined in claim 5 wherein the mounted ends of said tines are displaced above said axis of rotation when a tine is in contact with the soil so that the tine will be in a sweeping position best to utilize its flexing construction and its greater length.
12. A machine as defined in claim 11 wherein the free ends of said tines extend into the ground to a significant extent when they are directly below said axis.
13. A machine as defined in claim 11 wherein the mounted ends of said tines on said reel are offset relative the axis of rotation of said reel so that when the free end of a tine is in vertical alignment with the axis of rotation of said reel, the mounted end of said tine on said reel will be at the side of said axis of rotation toward said sifting member.
14. A machine as defined in claim 5 wherein each of said tines is square in cross section.
15. A machine as defined in claim 5 wherein said reel comprises a pair of tine mounts located at equal distances from, on opposite sides of, and paralleled to said axis of rotation; said tines mounted to said mounts in two planes spaced from said axis; and said tines cutting across the cylindrical path of rotation of said mounts.
16. A machine as defined in claim 5, and:
   c. wheels for supporting said sifting member and said reel, all of said wheels being mounted behind said sifting member and said reel and within the outer limits thereof whereby said wheels only contact ground previously treated by said sifting member and said reel.